(12) United States Patent
Viklund

(10) Patent No.: US 10,850,677 B2
(45) Date of Patent: Dec. 1, 2020

(54) AUTOMATIC SECUREMENT PIN SYSTEM FOR A HITCH CONNECTOR

(71) Applicant: Thule Sweden AB, Hillerstorp (SE)

(72) Inventor: Mark Viklund, New Milford, CT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 16/015,445

(22) Filed: Jun. 22, 2018

(65) Prior Publication Data
US 2019/0389394 A1    Dec. 26, 2019

(51) Int. Cl.
| | | |
|---|---|---|
| *B60R 9/06* | (2006.01) | |
| *B60R 9/10* | (2006.01) | |
| *B60D 1/52* | (2006.01) | |

(52) U.S. Cl.
CPC .......... *B60R 9/10* (2013.01); *B60R 9/06* (2013.01); *B60D 1/52* (2013.01)

(58) Field of Classification Search
CPC .............. B60R 9/06; B60R 9/10; B60D 1/025
USPC ................................................ 224/519–521
See application file for complete search history.

(56) References Cited

U.S. PATENT DOCUMENTS

| | | | |
|---|---|---|---|
| 1,448,950 A * | 3/1923 | Uecker | B60D 1/02 280/508 |
| 3,198,562 A | 8/1965 | Smith | |
| 3,263,058 A | 7/1966 | Goonan | |
| 3,889,979 A | 6/1975 | Schmiesing | |
| 3,971,186 A | 7/1976 | Havelka et al. | |
| 3,981,517 A * | 9/1976 | Crochet, Sr. | B60D 1/26 280/478.1 |
| 4,606,549 A | 8/1986 | Williams, Jr. | |
| 4,856,929 A | 8/1989 | Smahlik et al. | |
| 4,991,865 A | 2/1991 | Francisco | |
| 5,197,349 A | 3/1993 | Herman | |
| 5,244,133 A | 9/1993 | Abbott et al. | |
| 5,333,888 A | 8/1994 | Ball | |
| 5,344,175 A | 9/1994 | Speer | |
| 5,423,566 A | 6/1995 | Warrington et al. | |
| 5,685,686 A | 11/1997 | Burns | |
| 5,690,260 A | 11/1997 | Aikins et al. | |
| 5,915,900 A | 6/1999 | Boltz | |
| 6,378,621 B1 | 4/2002 | Graham et al. | |
| 6,598,897 B1 * | 7/2003 | Patti | B60D 1/06 280/478.1 |
| 6,835,021 B1 | 12/2004 | McMillan | |
| 6,942,237 B1 | 9/2005 | Dépault | |
| 6,951,287 B1 | 10/2005 | Randazzo | |
| 6,974,147 B1 | 12/2005 | Kolda | |
| 7,004,491 B1 | 2/2006 | Allsop et al. | |
| 7,093,845 B1 | 8/2006 | Fast | |
| 8,960,709 B2 * | 2/2015 | Prescott | B60D 1/48 280/507 |
| 9,421,836 B1 | 8/2016 | Ford et al. | |

(Continued)

FOREIGN PATENT DOCUMENTS

WO    WO 2015/040844 A1    3/2015

*Primary Examiner* — Adam J Waggenspack
(74) *Attorney, Agent, or Firm* — Sterne, Kessler, Goldstein & Fox P.L.L.C.

(57) ABSTRACT

An automatic securement pin system for a hitch connector includes a hitch bar having an insert end configured to be inserted into a hitch receiver, a securement pin coupled to the hitch bar, and an actuator coupled to the securement pin. The actuator is configured to engage the hitch receiver to displace the securement pin from an open position.

20 Claims, 14 Drawing Sheets

(56) References Cited

U.S. PATENT DOCUMENTS

| | | |
|---|---|---|
| 9,663,040 B1 | 5/2017 | Shen |
| 9,902,222 B1 | 2/2018 | Phillips |
| 10,005,329 B2 | 6/2018 | Phillips |
| 2002/0114688 A1 | 8/2002 | Poindexter et al. |
| 2003/0132259 A1 | 7/2003 | McLemore et al. |
| 2006/0208456 A1 | 9/2006 | Weaver |
| 2009/0001109 A1 | 1/2009 | Wilkins |
| 2009/0120984 A1 | 5/2009 | Sautter et al. |
| 2009/0218789 A1 | 9/2009 | Beck |
| 2010/0096424 A1 | 4/2010 | Kuschmeader et al. |
| 2010/0201102 A1 | 8/2010 | Weaver |
| 2010/0264627 A1 | 10/2010 | Mueller |
| 2010/0283225 A1 | 11/2010 | Lahn |
| 2011/0089669 A1 | 4/2011 | Després |
| 2012/0228852 A1 | 9/2012 | Bessette et al. |
| 2013/0032621 A1 | 2/2013 | Bogoslofski et al. |
| 2013/0033021 A1 | 2/2013 | Prescott et al. |
| 2013/0193742 A1 | 8/2013 | Eidsmore |
| 2014/0246467 A1 | 9/2014 | Hein et al. |
| 2015/0083770 A1 | 3/2015 | Ziola |
| 2016/0096406 A1 | 4/2016 | Ford |
| 2018/0050645 A1 | 2/2018 | Phillips |

\* cited by examiner

AUTOMATIC SECUREMENT PIN SYSTEM FOR A HITCH CONNECTOR

BACKGROUND

Field

The present disclosure relates to hitch attachment devices. More specifically, embodiments of the present disclosure relate to hitch-mounted load carriers, for example, bicycle carriers, with an automatic securement pin feature to secure the load carrier to a vehicle hitch.

Background

Devices for carrying equipment on a vehicle can be used to transport the equipment from one place to another. In some examples, the load carrier can be secured to the vehicle safely and conveniently via a hitch, typically attached to the rear of the vehicle. Various attachment mechanisms, for example, pins, can help secure the load carrier to the vehicle hitch. These pins, however, can become lost if not attached to the load carrier and need to be manually inserted by the user, often in hard to reach locations between the vehicle and load carrier.

BRIEF SUMMARY

In some embodiments, an automatic securement pin system for a hitch connector includes a hitch bar having an insert end configured to be inserted into a hitch receiver, a securement pin coupled to the hitch bar, and an actuator coupled to the securement pin. In some embodiments, the actuator is configured to engage the hitch receiver to displace the securement pin from an open position.

In some embodiments, the actuator includes a body portion disposed exterior to an outer surface of the hitch bar. In some embodiments, a lengthwise axis of the body portion is parallel to a lengthwise axis of the hitch bar. In some embodiments, the body portion is an elongate body portion extending in a direction of a length the hitch bar. In some embodiments, a length of the body portion is shorter than a length of the securement pin.

In some embodiments, the actuator is mechanically coupled to the securement pin. In some embodiments, the actuator is coupled to the securement pin by a spring. In some embodiments, the actuator includes a cavity. In some embodiments, a portion of the actuator is disposed in the cavity.

In some embodiments, the system includes a bracket coupled to the hitch bar. In some embodiments, the bracket includes a first tab and a second tab. In some embodiments, the securement pin is disposed between the first tab and the second tab. In some embodiments, the securement pin is pivotably coupled to the bracket. In some embodiments, a portion of the actuator is disposed within an interior of the bracket.

In some embodiments, the system includes a housing. In some embodiments, at least a portion of the bracket, the securement pin, and/or the actuator is disposed within the housing.

In some embodiments, a load carrier system includes a load carrier, a hitch bar coupled to the load carrier, the hitch bar having an insert end configured to be inserted into a hitch receiver, a securement pin coupled to the hitch bar, and an actuator coupled to the securement pin. In some embodiments, the actuator is configured to engage the hitch receiver to displace the securement pin from an open position. In some embodiments, the load carrier is a bicycle carrier.

In some embodiments, the load carrier system includes the hitch receiver. In some embodiments, the hitch receiver includes a hitch flange. In some embodiments, the actuator is configured to engage the hitch flange to displace the securement pin from the open position. In some embodiments, the hitch receiver includes an aperture. In some embodiments, a tip of the securement pin is configured to be disposed in the aperture in a closed position.

In some embodiments, a method of attaching a load carrier to a vehicle includes inserting a hitch bar into a hitch receiver, and engaging an actuator coupled to the hitch bar with the hitch receiver. In some embodiments, engaging the actuator displaces a securement pin coupled to the hitch bar from an open position. In some embodiments, engaging the actuator includes contacting the actuator with the hitch. In some embodiments, displacing the securement pin includes moving the securement pin from the open position to attachment closed position where a tip of the securement pin is disposed in an aperture in the hitch receiver. In some embodiments, engaging the actuator compresses a spring to release the securement pin. In some embodiments, the method includes moving the securement pin to the open position.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

Figure 1:
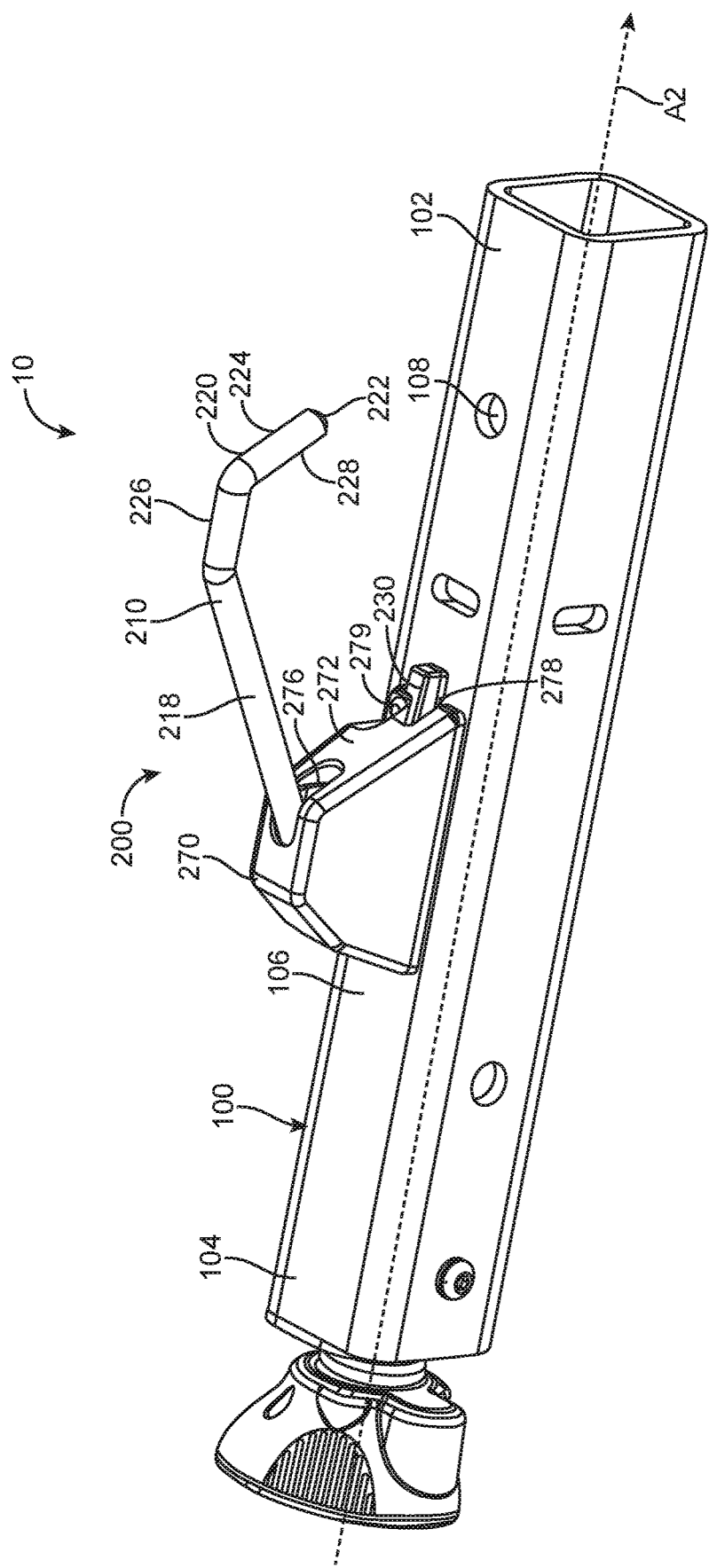
FIG. 1 illustrates a perspective view of a hitch bar with a securement pin system, according to an embodiment.

The features and advantages of the embodiments will become more apparent from the detailed description set forth below when taken in conjunction with the drawings, in

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Embodiments of the securement pin system 200 disclosed herein can be used with a load carrier 400, for example, but not limited to, a bicycle carrier or a cargo container. More specifically, the load carrier 400 can be a hitch-mounted bicycle carrier, which can be attached to a hitch receiver 300 of a vehicle. The bicycle carrier can be configured to carry one, two, three, or more bicycles.

Hitch-mounted load carriers can have one or more attachment mechanism to attach and secure the load carrier to the vehicle. Using multiple attachment mechanisms provides redundancy to decrease the likelihood of the load carrier becoming disconnected from the vehicle hitch. For example, an attachment mechanism, such as a wedge or lever arm, that is coupled to the load carrier and that is disposed inside the vehicle hitch can provide pressure on an interior surface of the vehicle hitch for a friction-fit attachment. Alternatively, or additionally, a locking pin (also referred to herein as a securement pin) can be inserted through an aperture in the vehicle hitch, and in some cases also through an aperture in the hitch bar of the load carrier to prevent decoupling of the load carrier from the vehicle hitch.

These locking pins, however, can become lost if not attached to the load carrier. Additionally, the pins need to be manually inserted by the user, often in hard to reach locations between the vehicle and load carrier. Depending on the strength of the person attaching the load carrier, the weight of the load carrier, and other environmental conditions, it can be difficult to secure the load carrier to the hitch receiver with the pin.

The present disclosure provides embodiments of a securement pin system where the securement pin is attached to the hitch bar of the load carrier to prevent the securement pin from being lost. And importantly, the securement pin automatically moves from an open position to a closed position simply by inserting the hitch bar of the load carrier into the vehicle hitch receiver. This allows the user to easily and confidently secure the load carrier to the hitch receiver without having to reach into the oftentimes small and low spaces between the load carrier and vehicle in order to secure the pin.

Figure 14:
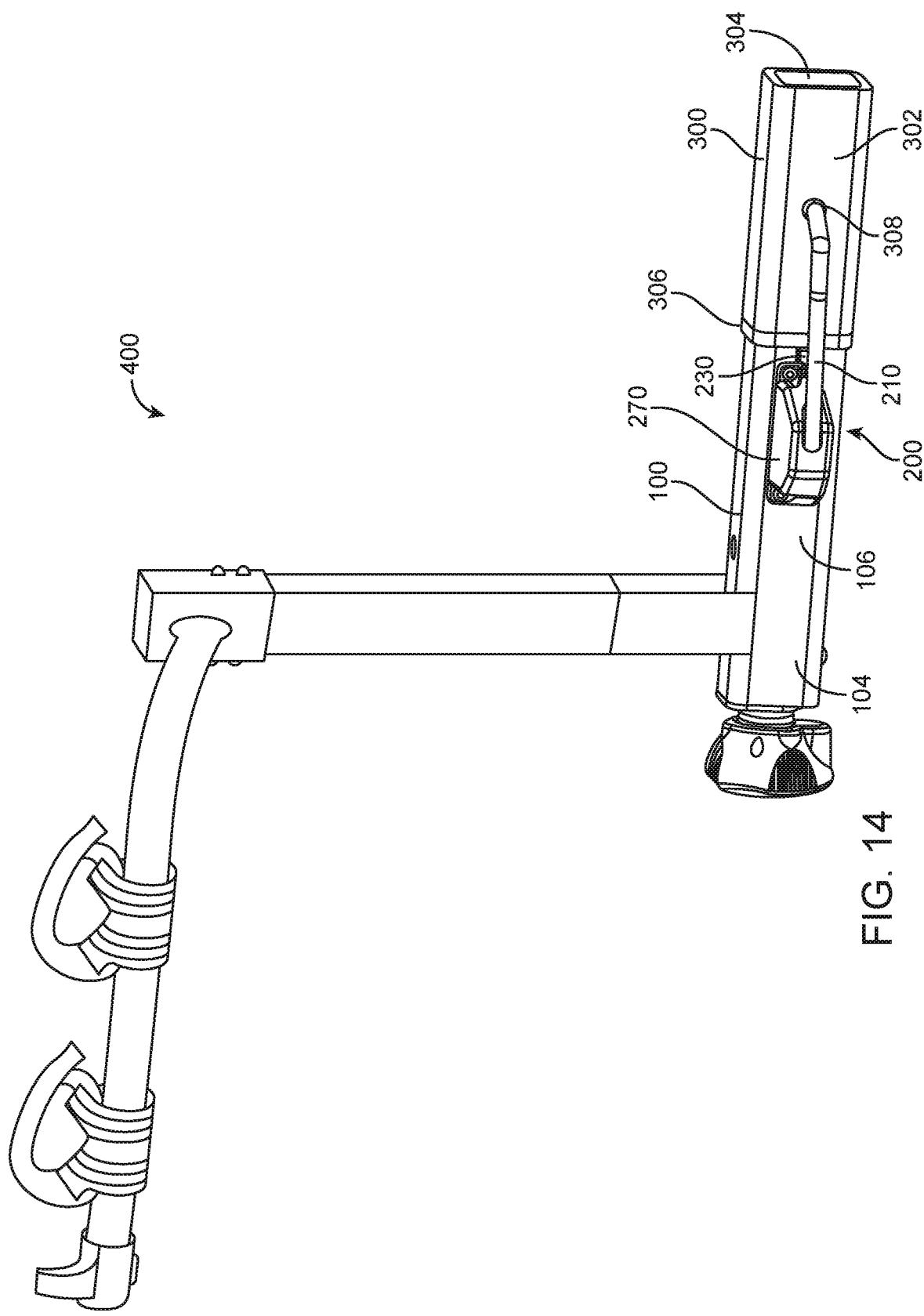
FIG. 14 illustrates a perspective view of a load carrier system, according to an embodiment.

By way of example, FIG. 1 illustrates securement pin system 200 attached to hitch bar 100. As shown, for example, in FIG. 14, hitch bar 100 can be a portion of a load carrier 400 that attaches to the hitch receiver 300 of a vehicle. Hitch bar 100 can include an insert end 102 and a load carrier end 104. Insert end 102 can be configured to be coupled to the hitch receiver 300 of a vehicle. For example, insert end 102 can have a size and shape corresponding to an interior of a hitch receiver 300, for example, a 1.25-inch or a 2-inch hitch receiver. For example, hitch bar 100 can have a hollow square or rectangle shape with rounded corners when viewed in cross-section. Generally, hitch bar 100 is a resilient material, for example, but not limited to, steel. Load carrier end 104 can have a load carrier 400 attached thereto, for example, a bicycle carrier as shown in FIG. 14. In some embodiments, the load carrier 400 can be configured to carry one or more bicycles. Other types of load carriers, such as cargo boxes or cargo platforms can be used.

Hitch bar 100 can include an outer surface 106 to which securement pin system 200 can be coupled. In some embodiments, hitch bar 100 can include an aperture 108, for example, near the insert end 102. In some embodiments, aperture 108 can be configured to receive a second end 220 of securement pin 210, and more specifically, a distal tip 222 of a securement pin 210 of securement pin system 200. For example, aperture 108 can have a diameter that is greater than a diameter of distal tip 222. In some embodiments, aperture 108 can be a recess in the outer surface 106 of hitch bar 100, rather than extending entirely through the material of hitch bar 100.

As shown, for example, in FIGS. 1 and 14, securement pin system 200 can be attached to hitch bar 100. As shown in FIG. 1, securement pin system 200 is in an open position 10, where securement pin 210 is disposed in a position away from hitch bar 100. As discussed below, securement pin 210 can be retained in the open position, for example, by a bracket, so that the user does not need to hold the securement pin 210 in the open position. In some embodiments, prior to inserting the hitch bar 100 into the hitch receiver 300, the user can move the securement pin 210 into the open position 10 by lifting the securement pin away from the hitch bar 100. As described herein, the securement pin 210 can remain in the open position 10, without being held by the user. As shown in FIG. 14, securement pin 210 of securement pin system 200 is in a closed position 20, with securement pin 210 attached to hitch receiver 300.

Hitch receiver 300 can include an outer surface 302 and an inner surface 304. In some embodiments, hitch receiver 300 can have an aperture 308 disposed through outer surface 302 such that the distal tip 222 of securement pin 210 can be disposed in aperture 308 of hitch receiver 300 to secure hitch bar 100 to hitch receiver 300. In some embodiments, in the closed position 20, the distal tip 222 of securement pin 210 can be disposed through both the aperture 308 of hitch receiver 300 and an aperture 108 of hitch bar 100. In some embodiments, the distal tip 222 of securement pin 210 can be disposed through aperture 308 of hitch receiver 300 and contact the outer surface 106 of hitch bar 100.

In some embodiments, hitch receiver 300 can include a hitch flange 306, for example, at a distal end of hitch receiver 300. Hitch flange 306 can be a surface extending from outer surface 302 of hitch receiver 300. In some embodiments, hitch flange 306 can extend around the entirety of outer surface 302. In some embodiments, hitch flange 306 can be disposed along a portion of hitch receiver 300, for example, only along a portion of outer surface 302 corresponding to the surface to which securement pin system 200 is attached to hitch bar 100.

Figure 2:
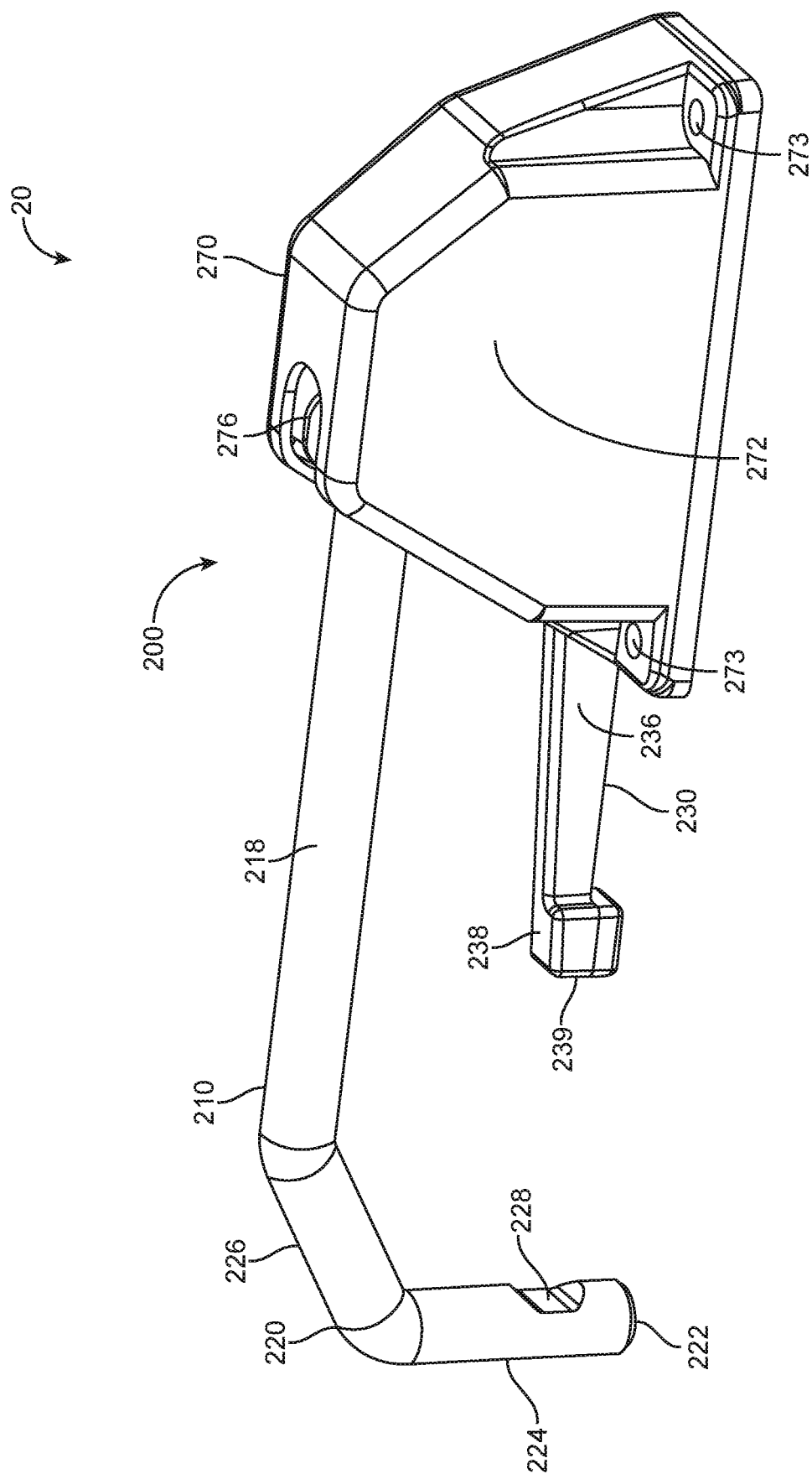
FIG. 2 illustrates a perspective view of a securement pin system, according to an embodiment.
Figure 3:
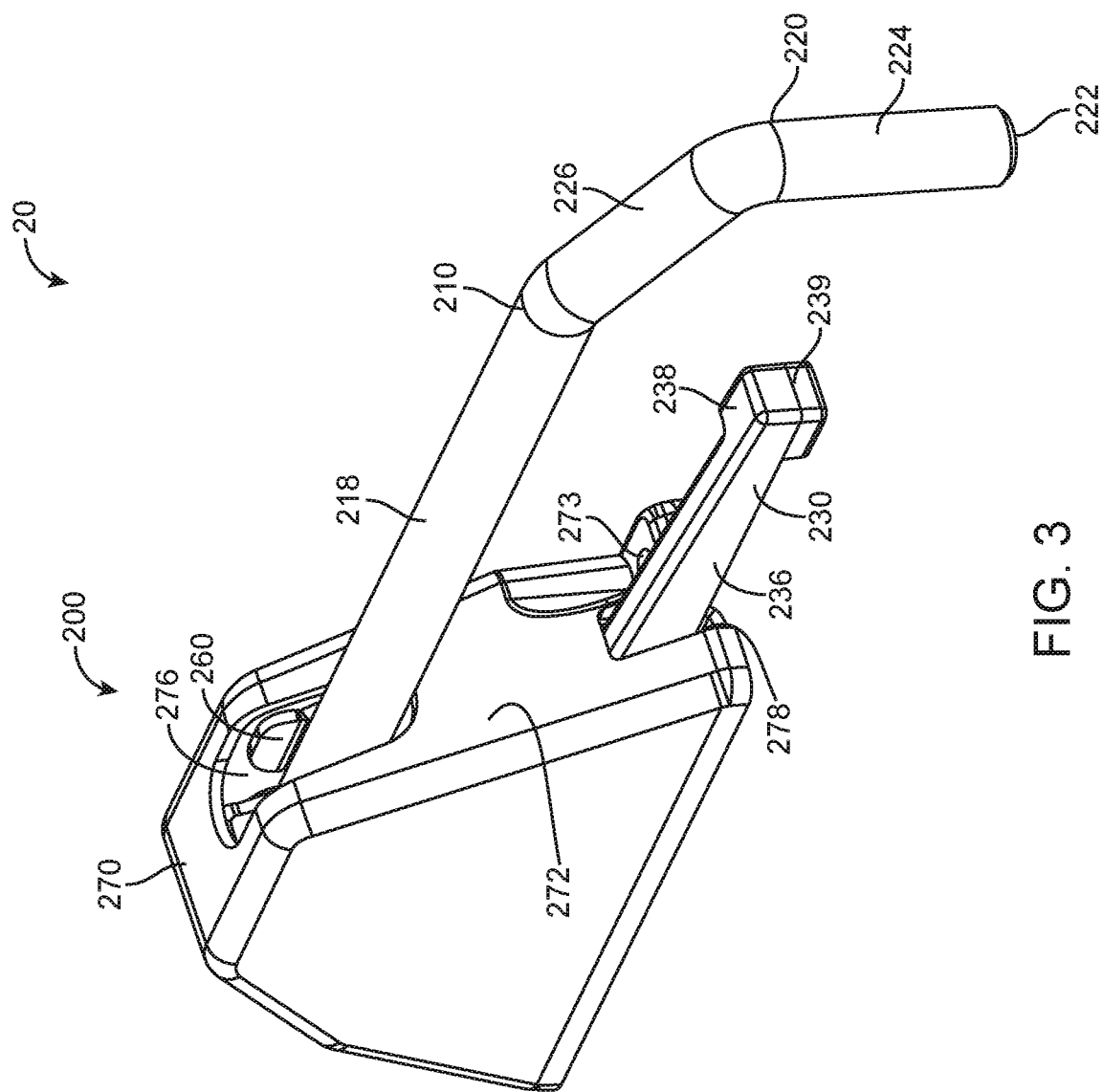
FIG. 3 illustrates a perspective view of a securement pin system, according to an embodiment.
Figure 4:
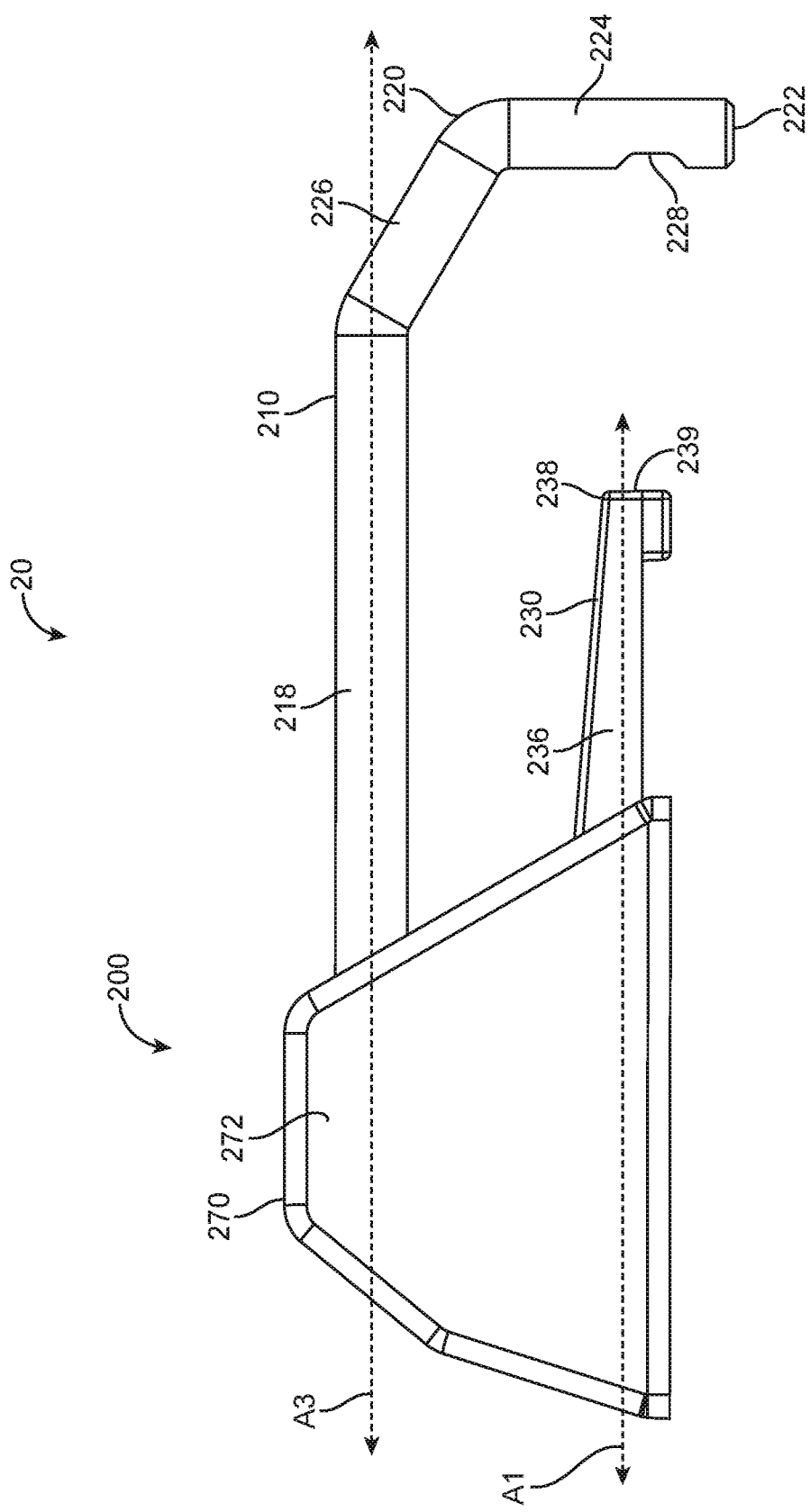
FIG. 4 illustrates a side view of a securement pin system, according to an embodiment.

FIGS. 2-4 illustrate an embodiment of securement pin system 200. In some embodiments, securement pin system 200 can include securement pin 210, actuator 230, and housing 270. As shown, for example, in FIGS. 5 and 6, where housing 270 is removed, in some embodiments, securement pin system 200 can include a mechanical coupling (e.g., spring 250) and/or bracket 260.

In some embodiments, housing 270 can cover at least a portion of securement pin 210, actuator 230, and/or bracket 260. Housing 270 can protect these components from environmental conditions, for example, dirt or water, which can inhibit the function of securement pin system 200. In some embodiments, housing 270 can include holes 273 for fasteners 279, such as screws, which can attach securement pin system 200 to hitch bar 100. Housing 270 can be made from, for example, but not limited to, plastic or metal. Housing 270 can have different sizes or shapes depending on the size, shape, and configurations of, for example, securement pin 210, actuator 230, and/or bracket 260 housed therein.

As shown, for example, in FIGS. 2-4 and 12, in some embodiments, housing 270 can have an outer surface 272 and one or more openings to allow the securement pin 210 and actuator 230 to extend out of an interior 274 of the housing 270. For example, in some embodiments, housing 270 can include a first opening 276 for securement pin 210 and a second opening 278 for actuator 230. In some embodiments, first opening 276 can be larger than second opening 278. In some embodiments, first opening 276 can be formed through two adjacent surfaces of housing 270, for example, as shown in FIG. 3. This can provide sufficient room for securement pin 210 to rotate from the closed position 20 to the open position 10.

As shown, for example, in the side view of FIG. 4, securement pin 210 can have a lengthwise axis A3 and actuator 230 can have a lengthwise axis A1. A3 can be the lengthwise axis of elongate body portion 218 of securement pin 210 and A1 can be the lengthwise axis of elongate body portion 236 of actuator 230. In some embodiments, A3 can be parallel to A1 when securement pin 210 is in the closed position 20. Further, in some embodiments, A3 and/or A1 can be parallel to a lengthwise axis A2 of hitch bar 100 when securement pin 210 is in the closed position 20. A2 is shown, for example, in FIG. 1.

As also shown in FIG. 4, in some embodiments, a distal tip 222 at second end 220 of securement pin 210 can be disposed below actuator 230 in the closed position 20. This can allow distal tip 222 of securement pin 210 to extend through aperture 308 of hitch receiver 300 and, in some embodiments, through aperture 108 of hitch bar 100. In some embodiments, second end 220 of securement pin 210 can have a notch 228, which can engage an interior surface of aperture 308 of hitch receiver 300 to secure the securement pin 210 within aperture 308.

Figure 5:
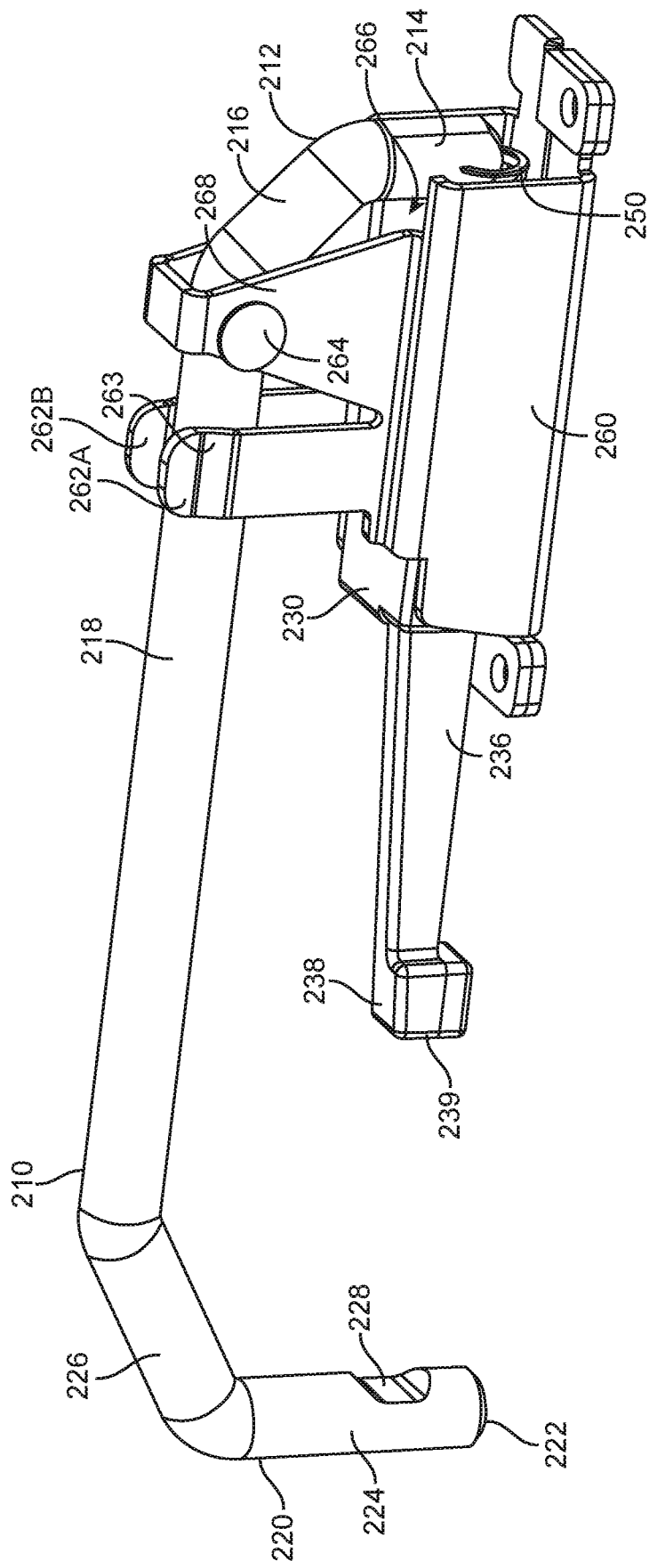
FIG. 5 illustrates a perspective view of a securement pin system with a housing removed, according to an embodiment.
Figure 6:
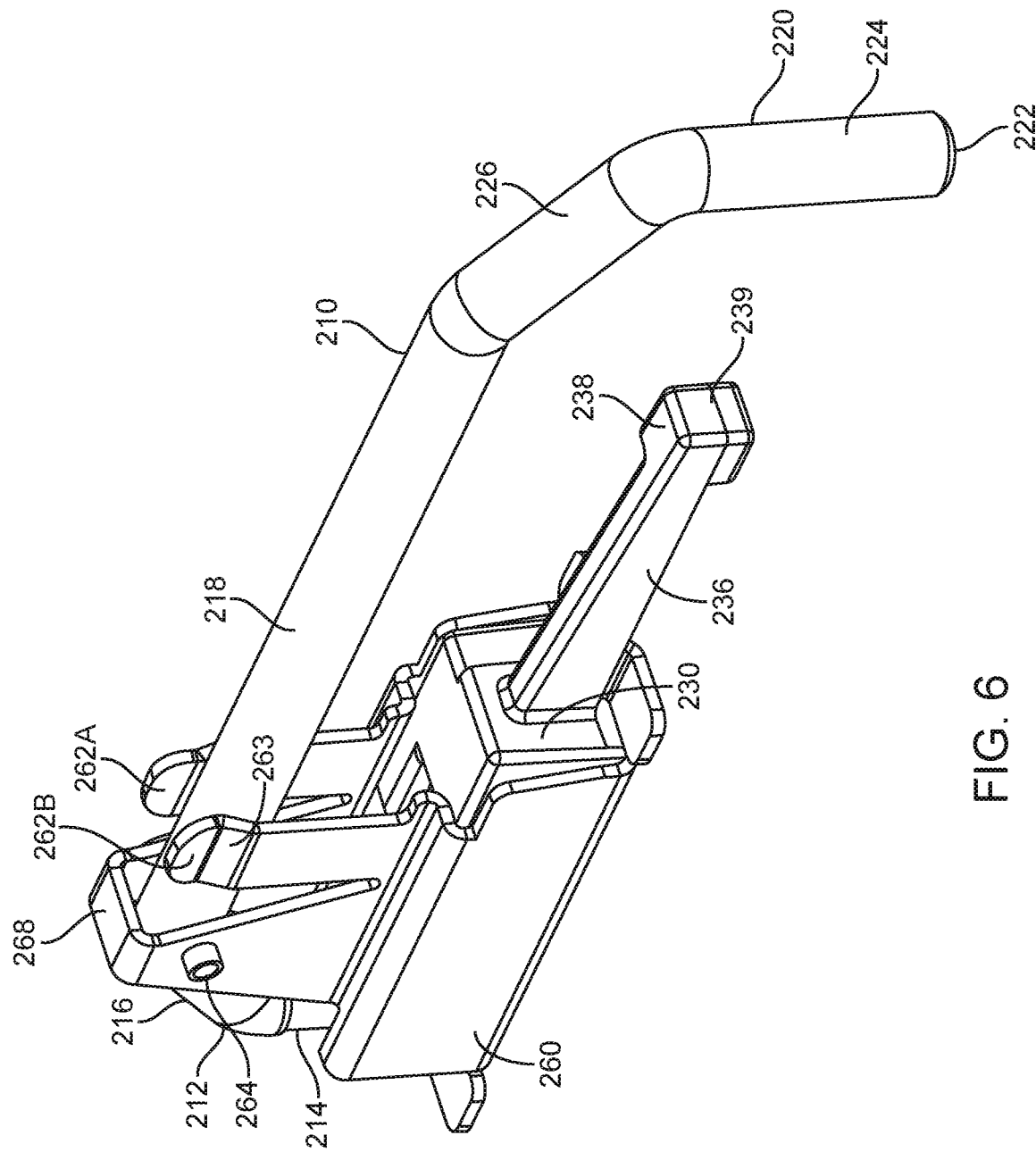
FIG. 6 illustrates a perspective view of a securement pin system with a housing removed, according to an embodiment.
Figure 7:
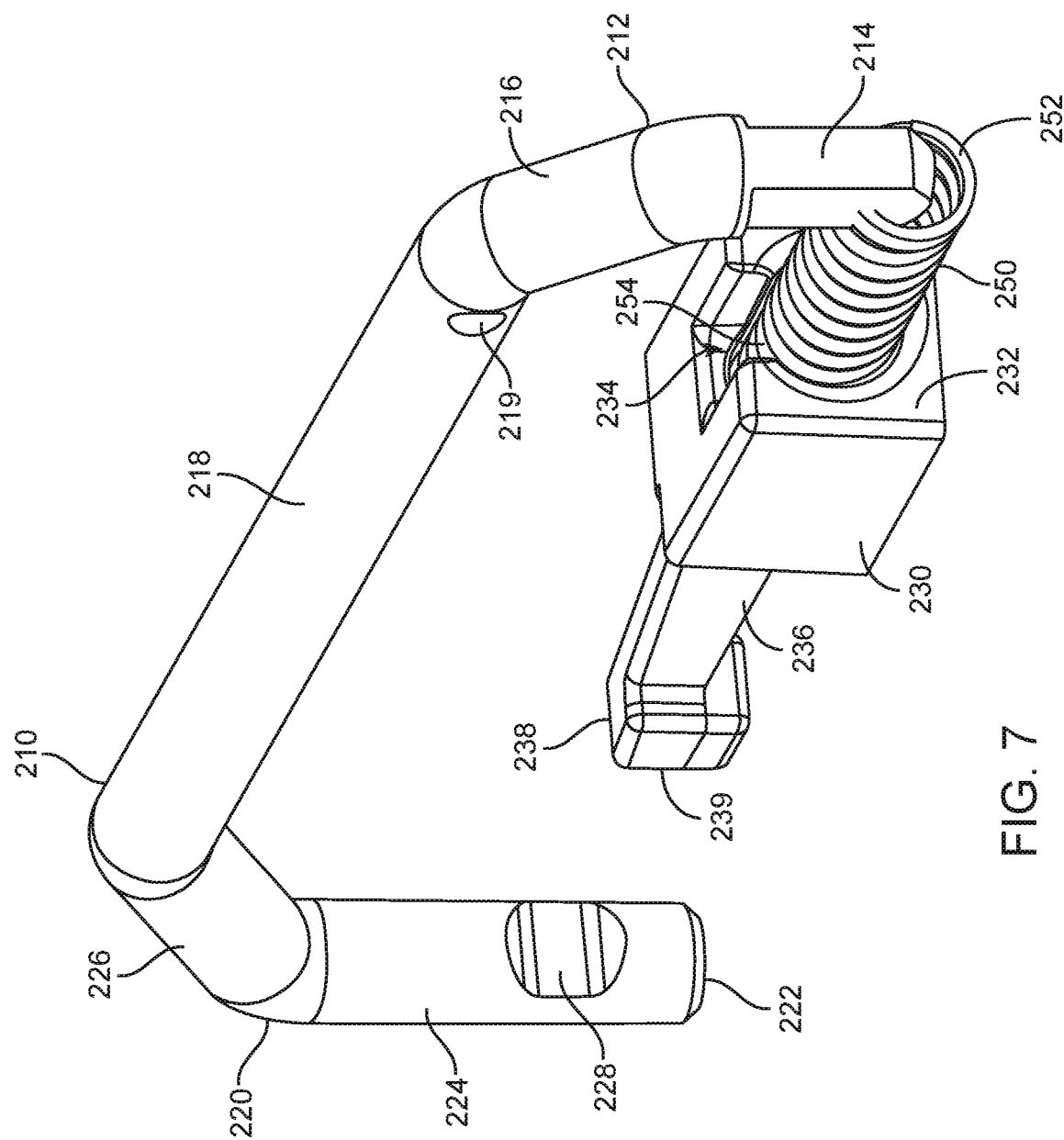
FIG. 7 illustrates a perspective view of a portion of a securement pin system, according to an embodiment.

As shown, for example, in FIGS. 1-7, securement pin 210 can have a first end 212, an elongate body portion 218, and a second end 220. In some embodiments, elongate body portion 218 can be the longest segment of securement pin 210. In some embodiments, second end 220 can include distal tip 222, which can include notch 228. In some embodiments, securement pin 210 can have a non-straight lengthwise shape. As shown, for example, in FIGS. 5-7, in some embodiments, first end 212 can have a vertical portion 214 and an angled portion 216. In some embodiments, second end 220 can include vertical portion 224 and angled portion 226. In some embodiments, notch 228 can be disposed in vertical portion 224 of second end 220 of securement pin 210. In some embodiments, for example, as shown in FIG. 7, securement pin 210 can include a hole 219 through which a pivot pin 264 or other fastener can be disposed, as shown in FIG. 5.

Figure 13:
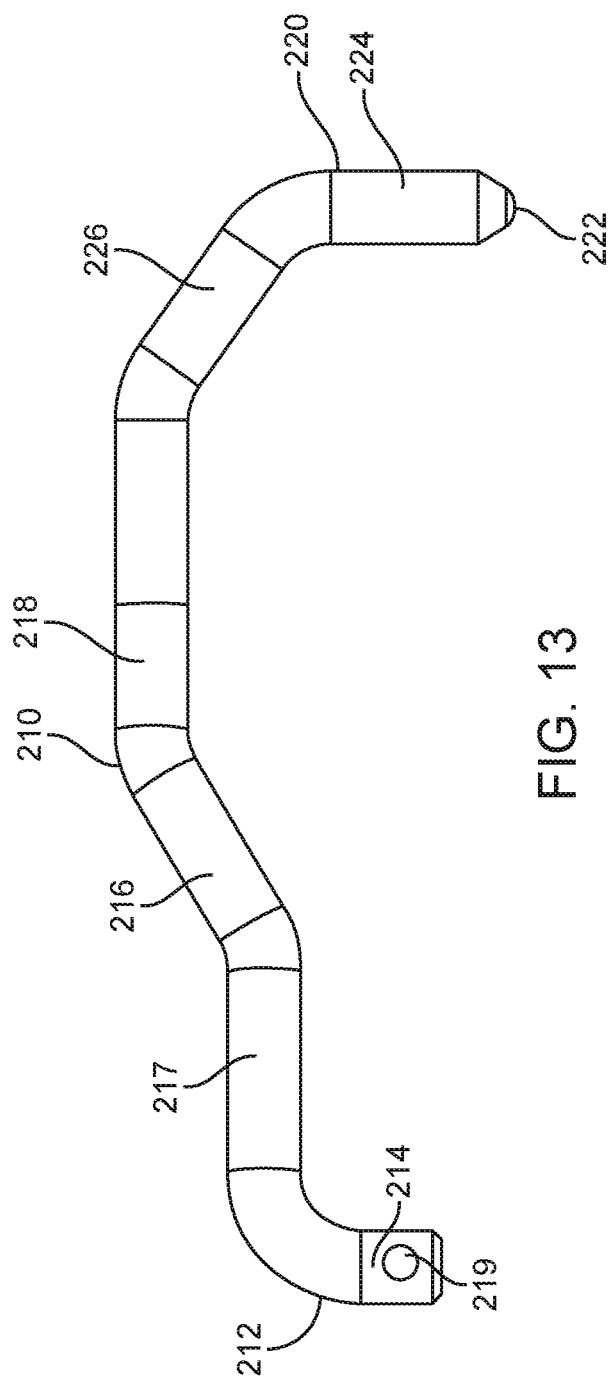
FIG. 13 illustrates a side view of a pin for a securement pin system, according to an embodiment.

Generally, securement pin 210 is a resilient material, for example, but not limited to, steel. Other shapes, sizes, angles, bends, and configurations are contemplated for securement pin 210 as illustrated, for example, in the embodiment shown in FIG. 13. In some embodiments, securement pin 210 can include a first end 212 having a vertical portion 214 with a hole 219 for a pin through vertical portion 214. In some embodiments, securement pin 210 can include a horizontal portion near first end 212 with an angled portion 216 extending therefrom. In some embodiments, elongate body portion 218 can extend from angled portion 216. In some embodiments, a second angled portion 226 can extend from elongate body portion 218 near second end 220. In some embodiments, second end 220 can include a vertical portion 224 and a distal tip 222.

As shown, for example in FIGS. 5-7, the securement pin 210 can be coupled to an actuator 230. For example, the securement pin 210 and actuator 230 can be coupled by a mechanical coupling such as spring 250, as illustrated in FIGS. 5-7. In some embodiments, a first end 212 of securement pin 210, for example, at vertical portion 214, can be coupled to a first end 252 of spring 250 and a first end 232 of actuator 230 can be coupled to a second end 254 of spring 250. Other mechanical couplings can be used to couple securement pin 210 with actuator 230 in a similar manner. For example, linkages, rods, wires, or other mechanical coupling elements can couple securement pin 210 with actuator 230 in order to translate forces between actuator 230 and securement pin 210.

Figure 8:
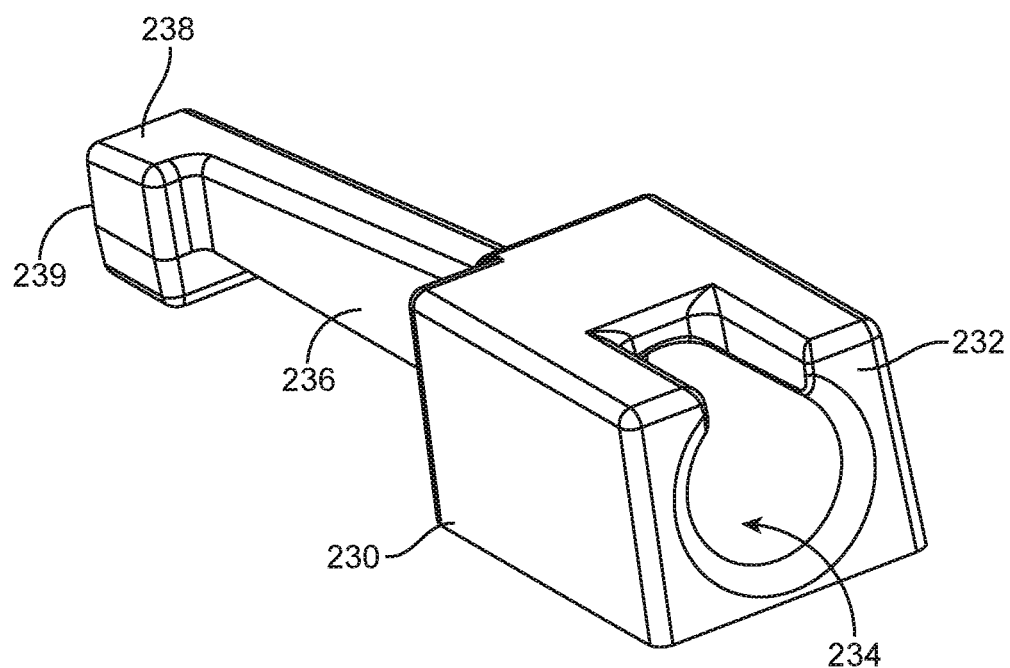
FIG. 8 illustrates a perspective view of an actuator for a securement pin system, according to an embodiment.
Figure 9:
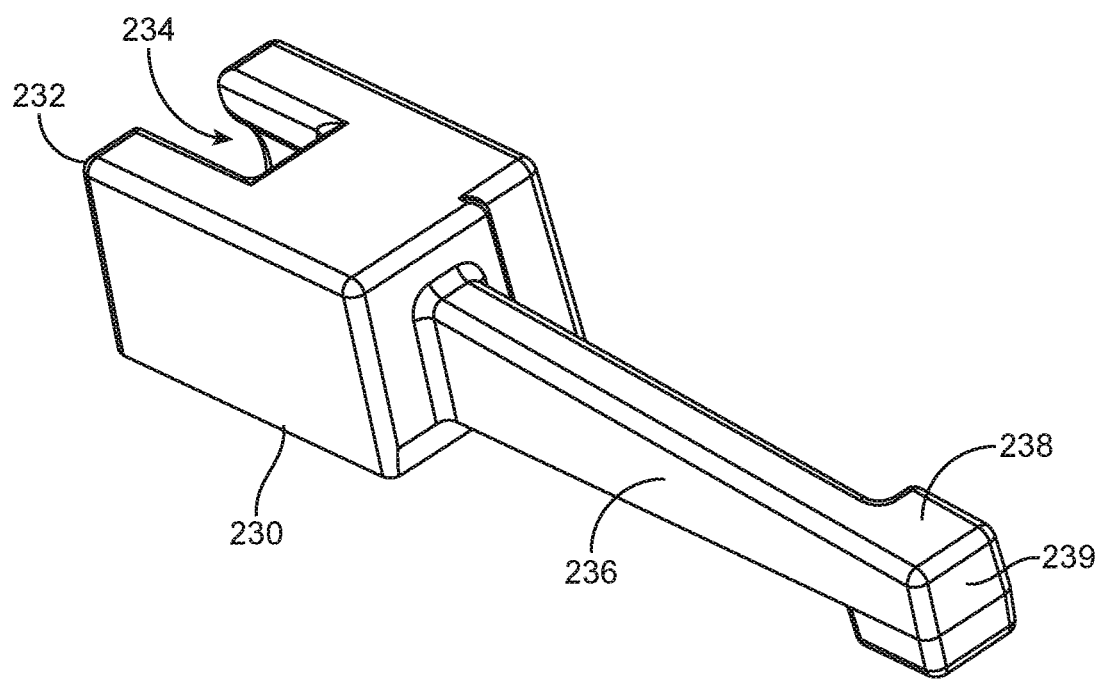
FIG. 9 illustrates a perspective view of an actuator for a securement pin system, according to an embodiment.

FIGS. 8 and 9 illustrate perspective views of an actuator 230, according to an embodiment. In some embodiments, actuator 230 can have a first end 232 that is coupled to securement pin 210. As shown, for example in FIG. 8, in some embodiments, the actuator 230 can include a cavity 234 in first end 232. In some embodiments, cavity 234 can be cylindrical, such that the mechanical coupling (e.g., spring 250) can be inserted within cavity 234, as shown, for example, in FIG. 7. In some embodiments, when the securement pin 210 is moved to the open position 10, the spring 250 can compress within the cavity 234 of actuator 230.

In some embodiments, actuator 230 can include a body portion, for example, an elongate body portion 236 extending from first end 232. In some embodiments, a second end 238 of actuator 230 can include a distal tip 239. In some embodiments, distal tip 239 can be wider than elongate body portion 236. Generally, second end 238 of actuator 230 is configured to engage a portion of the hitch receiver 300, for example, hitch flange 306, as shown in FIG. 14. When actuator 230 engages hitch receiver 300, additional force is placed on the mechanical coupling (e.g., spring 250), thereby causing securement pin 210 to rotate from the open position 10 to the closed position 20. In some embodiments, this force can overcome an opposing force against securement pin 210 applied, for example, by a retaining element of a bracket 260 (e.g., one or more tabs 262A, 262B), discussed below, that holds the securement pin 210 in the open position 10.

Other types of actuators are contemplated beyond those illustrated in the Figures. For example, in some embodiments, actuator 230 can be a solid component without a cavity. For example, the spring 250 or other mechanical coupling component can be disposed against or coupled to first end 232 of actuator 230. Actuator 230 can be other shapes, sizes, and configurations. For example, actuator 230 can be square, rectangular, cylindrical, or a non-uniform shape. Moreover, actuator 230 can include other actuation mechanisms, including but not limited to, magnetic or optical actuation devices. For example, actuator 230 and securement pin 210 can be coupled electrically, for example, where actuator 230 is a sensor in wired or wireless electrical communication with securement pin 210. In such an embodiment, an electrical signal can be sent, for example, when actuator 230 is disposed within a certain proximity of hitch receiver 300, causing the release of securement pin 210 from the open position 10 to the closed position 20. In some embodiments, actuator 230 can be magnetic, such that as actuator 230 approaches hitch receiver 300 having an opposite polarity, force is applied from the actuator 230 in a direction opposite the hitch receiver 300 to securement pin 210.

Figure 10:
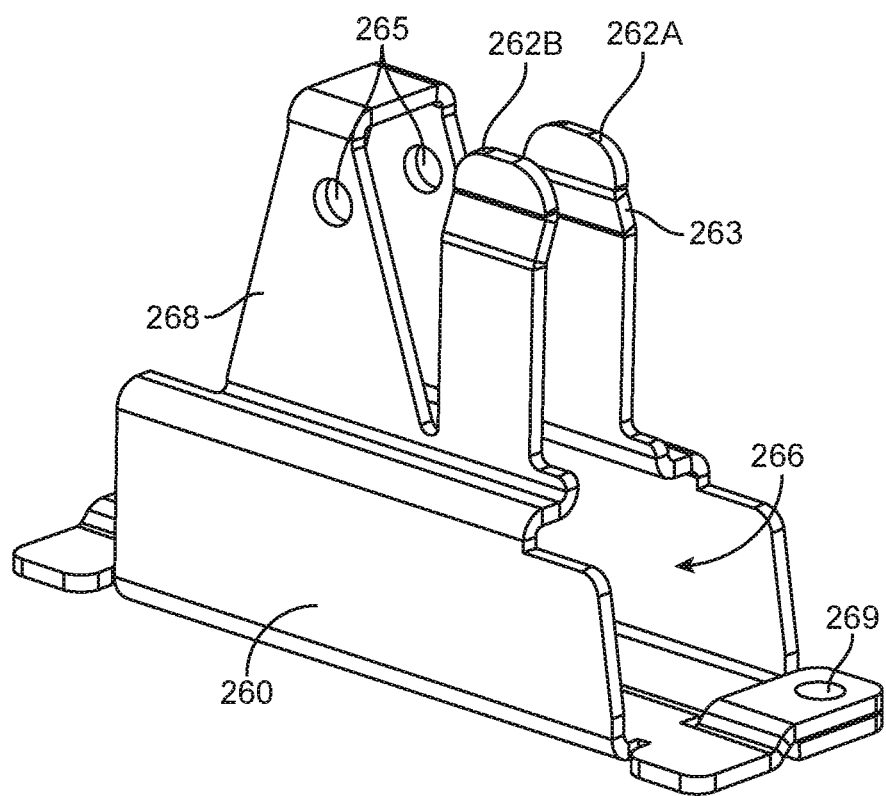
FIG. 10 illustrates a perspective view of a bracket for a securement pin system, according to an embodiment.

In some embodiments, as shown, for example, in FIGS. 5 and 6, at least a portion of the assembled securement pin 210, mechanical coupling (e.g., spring 250), and/or actuator 230, can be coupled to and/or disposed within a bracket 260. As shown, for example, in FIGS. 5, 6, and 10, in some embodiments, bracket 260 can define an interior space 266 within which at least a portion of securement pin 210, mechanical coupling (e.g., spring 250), and/or actuator 230 can be disposed. In some embodiments, bracket 260 can include a retaining mechanism, for example, a first tab 262A and a second tab 262B. In some embodiments, the retaining mechanism can retain the securement pin 210 in the open position 10, without being held on to by the user. In some embodiments, the retaining mechanism can be separate from the bracket 260. In some embodiments, one or both of tabs 262A, 262B can include an indented portion 263 such that a space between tabs 262A and 262B is narrowed. This narrowed space can exert pressure on securement pin 210, thereby retaining securement pin 210 in place, for example, in the closed position. This force can be overcome, for example, when a user pulls the securement pin 210 from the closed position 20 to the open position 10.

Figure 11:
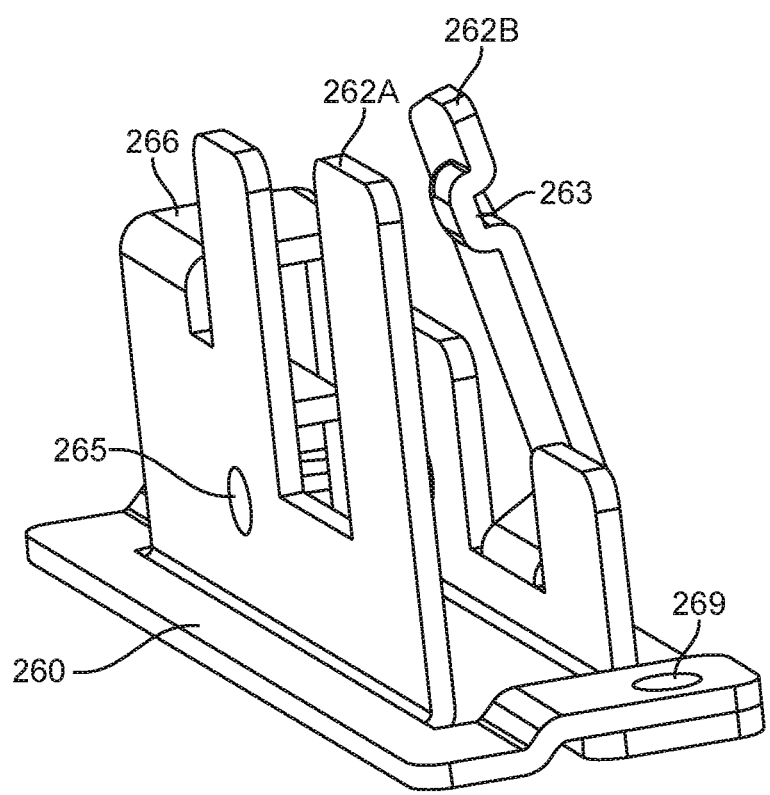
FIG. 11 illustrates a perspective view of a bracket for a securement pin system, according to an embodiment.
Figure 12:
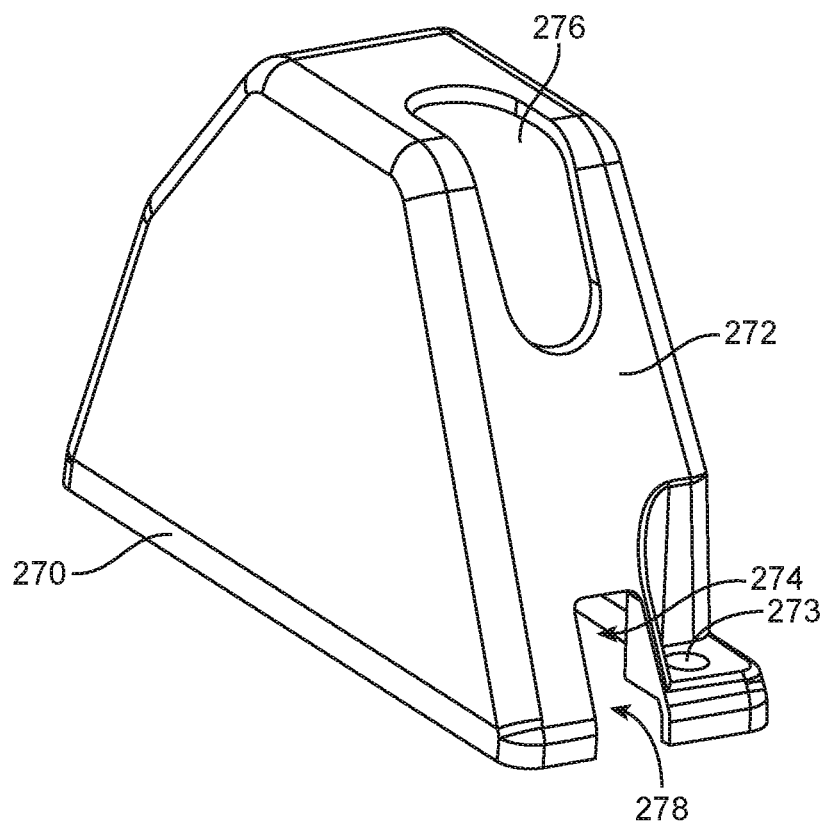
FIG. 12 illustrates a perspective view of a housing for a securement pin system, according to an embodiment.

In some embodiments, bracket 260 can include one or more upright portion 268. In some embodiments, upright portion 268 can include one more holes 265 through which a pivot pin 264 or other fastener can be disposed to rotatably couple securement pin 210 within bracket 260. In some embodiments, bracket 260 can include one or more holes 269 through which a screw or other fastener can be used to couple bracket 260 with housing 270 and/or hitch bar 100. Alternative brackets may be used, for example, as shown, in FIG. 11. In FIG. 11, a first tab 262A has a vertical orientation and a second tab 262B has an angled orientation. In some embodiments, one or both of the tabs 262A, 262B can include an indented portion 263, which can facilitate retaining securement pin 210 by friction fit.

Methods of securing a load carrier to a hitch receiver can be accomplished according to the manners of operation disclosed herein. In some embodiments, securement pin 210 can be disposed in an open position 10. In some embodiments, this can be accomplished by the user moving the securement pin 210 to the open position 10. In some embodiments, the securement pin 210 can be retained in the open position 10, without the user holding the securement pin 210.

In some embodiments, hitch bar 100, for example, the hitch bar of a load carrier 400, can be inserted into a hitch receiver 300, for example, the hitch receiver of a vehicle. In some embodiments, an actuator 230 can engage the hitch receiver 300. In some embodiments, the actuator 230 can contact the hitch receiver 300, for example, at the hitch flange 306 of the hitch receiver 300. In some embodiments, when the actuator 230 engages the hitch receiver 300, the securement pin 210 can be automatically displaced (i.e., without be touched by the user) from the open position 10 to a closed position 20. In some embodiments, when the actuator 230 engages the hitch receiver 300, force is applied to the securement pin 210, for example, via a coupling mechanism (e.g., a spring 250) coupling the actuator 230 and securement pin 210. In some embodiments, displacing the securement pin 210 to the closed position 20 disposes a distal tip 222 of the securement pin 210 within an aperture 308 of the hitch receiver 300. In some embodiments, a user can manually displace the securement pin 210 from the open position 10 to the closed position 20.

It is to be appreciated that the Detailed Description section, and not the Brief Summary and Abstract sections, is intended to be used to interpret the claims. The Summary and Abstract sections may set forth one or more but not all exemplary embodiments of load carriers and securement pin systems as contemplated by the inventors, and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. An automatic securement pin system for a hitch connector, comprising:

a hitch bar comprising an insert end configured to be inserted into a hitch receiver;

a securement pin coupled to the hitch bar; and an actuator disposed entirely exterior to an outer surface of the hitch bar and coupled to the securement pin, wherein the actuator is configured to engage the hitch receiver to displace the securement pin from an open position, wherein the actuator comprises a distal tip extending along the outer surface of the hitch bar and configured to contact a hitch flange of the hitch receiver, wherein the actuator comprises a body portion extending from the distal tip, and wherein the body portion is coupled to the securement pin.

2. The automatic securement pin system of claim 1, wherein a lengthwise axis of the body portion is parallel to a lengthwise axis of the hitch bar.

3. The automatic securement pin system of claim 1, wherein the body portion is an elongate body portion extending in a direction of a length of the hitch bar.

4. The automatic securement pin system of claim 1, wherein a length of the body portion is shorter than a length of the securement pin.

5. The automatic securement pin system of claim 1, wherein the actuator is mechanically coupled to the securement pin.

6. The automatic securement pin system of claim 5, wherein the actuator comprises a spring and a cavity, wherein a portion of the spring is disposed in the cavity.

7. The automatic securement pin system of claim 1, further comprising a bracket coupled to the hitch bar, wherein the securement pin is coupled to the bracket.

8. The automatic securement pin system of claim 7, wherein the securement pin is pivotably coupled to the bracket.

9. The automatic securement pin system of claim 8, wherein a portion of the actuator is disposed within an interior of the bracket.

10. The automatic securement pin system of claim 7, further comprising a housing, wherein at least a portion of each of the bracket, the securement pin, and the actuator is disposed within the housing.

11. The automatic securement pin system of claim 1, wherein a lengthwise axis of the body portion and a lengthwise axis of the hitch bar are coplanar.

12. The automatic securement pin system of claim 1, wherein the distal tip is wider than the body portion.

13. The automatic securement pin system of claim 1, wherein the distal tip contacts the outer surface of the hitch bar.

14. A load carrier system, comprising:
a load carrier;
a hitch bar coupled to the load carrier, the hitch bar comprising an insert end configured to be inserted into a hitch receiver;
a securement pin coupled to the hitch bar;
an actuator disposed entirely exterior to an outer surface of the hitch bar and coupled to the securement pin; and
a spring having a first end contacting a distal end of the securement pin and a second end opposite the first end contacting a distal end of the actuator,
wherein the actuator is configured to engage the hitch receiver to displace the securement pin from an open position.

15. The load carrier system of claim 14, wherein the load carrier is a bicycle carrier.

16. The load carrier system of claim 14, further comprising the hitch receiver.

17. The load carrier system of claim 16, wherein the hitch receiver comprises a hitch flange, and wherein the actuator is configured to engage the hitch flange to displace the securement pin from the open position.

18. The load carrier system of claim 16, wherein the hitch receiver comprises an aperture, and wherein a tip of the securement pin is configured to be disposed in the aperture in a closed position.

19. The load carrier system of claim 14, further comprising a housing disposed along the outer surface of the hitch bar, wherein the spring, the securement pin, and the actuator are at least partially disposed within the housing.

20. The load carrier system of claim 19, wherein the housing is disposed entirely on a single outer surface face of the hitch bar.

* * * * *